(12) United States Patent
Ito et al.

(10) Patent No.: US 9,686,583 B2
(45) Date of Patent: Jun. 20, 2017

(54) ELECTRONIC APPARATUS AND DISPLAY METHOD BY ELECTRONIC APPARATUS

(71) Applicants: KABUSHIKI KAISHA TOSHIBA, Minato-ku, Tokyo (JP); Toshiba Lifestyle Products & Services Corporation, Ome-shi, Tokyo (JP)

(72) Inventors: Hiroaki Ito, Kokubunji Tokyo (JP); Tetsuya Kitamura, Inagi Tokyo (JP); Masami Tanaka, Ome Tokyo (JP)

(73) Assignees: Kabushiki Kaisha Toshiba, Tokyo (JP); Toshiba Visual Solutions Corporation, Misawa-Shi, Aormori (JP)

( * ) Notice: Subject to any disclaimer, the term of this patent is extended or adjusted under 35 U.S.C. 154(b) by 0 days.

(21) Appl. No.: 14/948,127

(22) Filed: Nov. 20, 2015

(65) Prior Publication Data

US 2016/0212477 A1 Jul. 21, 2016

(30) Foreign Application Priority Data

Jan. 19, 2015 (JP) ................................. 2015-008036

(51) Int. Cl.
*H04N 21/43* (2011.01)
*H04N 21/433* (2011.01)
*H04N 21/482* (2011.01)
*H04N 21/422* (2011.01)
*H04N 21/431* (2011.01)

(52) U.S. Cl.
CPC ..... *H04N 21/4332* (2013.01); *H04N 21/4221* (2013.01); *H04N 21/431* (2013.01); *H04N 21/4825* (2013.01)

(58) Field of Classification Search
None
See application file for complete search history.

(56) References Cited

U.S. PATENT DOCUMENTS

| 5,623,613 A * | 4/1997 | Rowe .................... G06F 3/0482 348/E5.105 |
| 7,047,550 B1 * | 5/2006 | Yasukawa .......... H04N 5/44543 348/E5.105 |
| 2002/0124256 A1 | 9/2002 | Suzuka |
| 2003/0208760 A1 * | 11/2003 | Sugai ..................... H04H 60/07 725/50 |
| 2008/0129521 A1 * | 6/2008 | Yoon .................... H04H 20/426 340/636.1 |

FOREIGN PATENT DOCUMENTS

| JP | 2001-313878 A | 11/2001 |
| JP | 2007-180967 A | 7/2007 |

* cited by examiner

*Primary Examiner* — Cai Chen
(74) *Attorney, Agent, or Firm* — Rutan & Tucker, LLP

(57) ABSTRACT

According to one embodiment, a genre classification unit is provided to classify a plurality of programs based on genres with reference to program information. Further, a day classification unit is provided to classify the classified programs based on broadcast days. A display form controller sorts program information description cells of the programs classified based on days into display areas based on days on a display device. When a program information description cell of a display area of a specified day is scrolled, the display form controller controls data so as to display program information description cells of display areas of days other than the specified day in a still state.

18 Claims, 16 Drawing Sheets

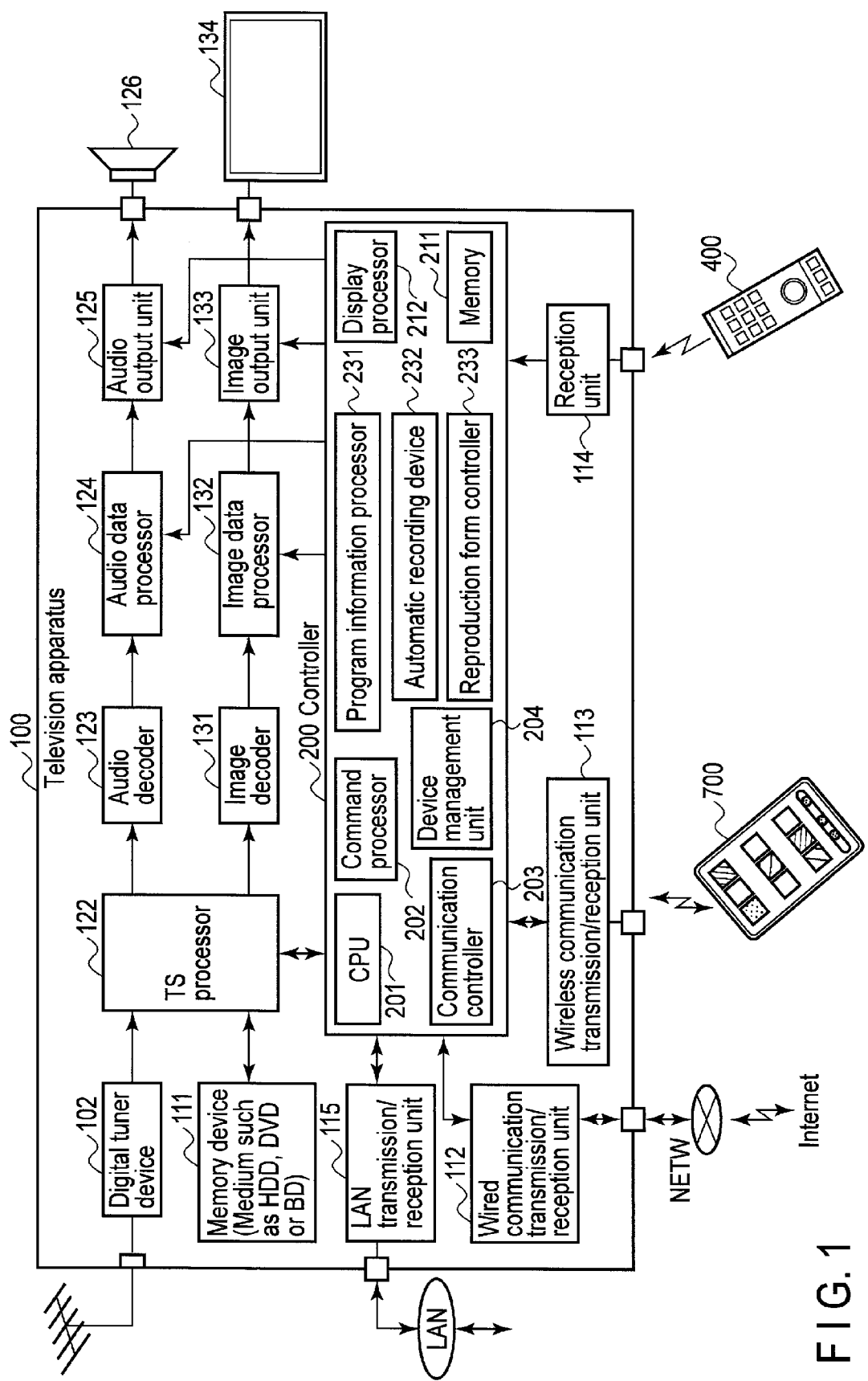
F I G. 1

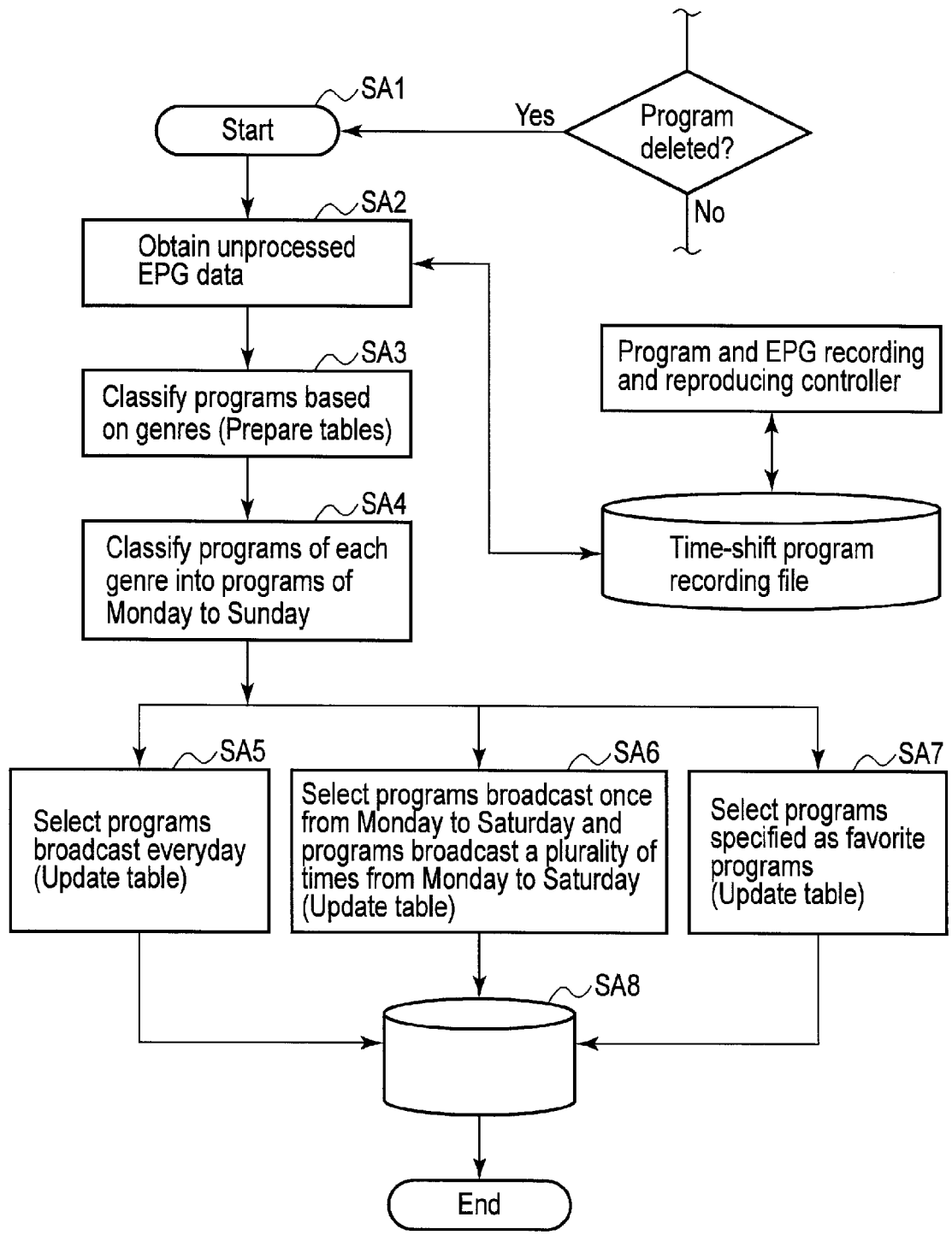
F I G. 4

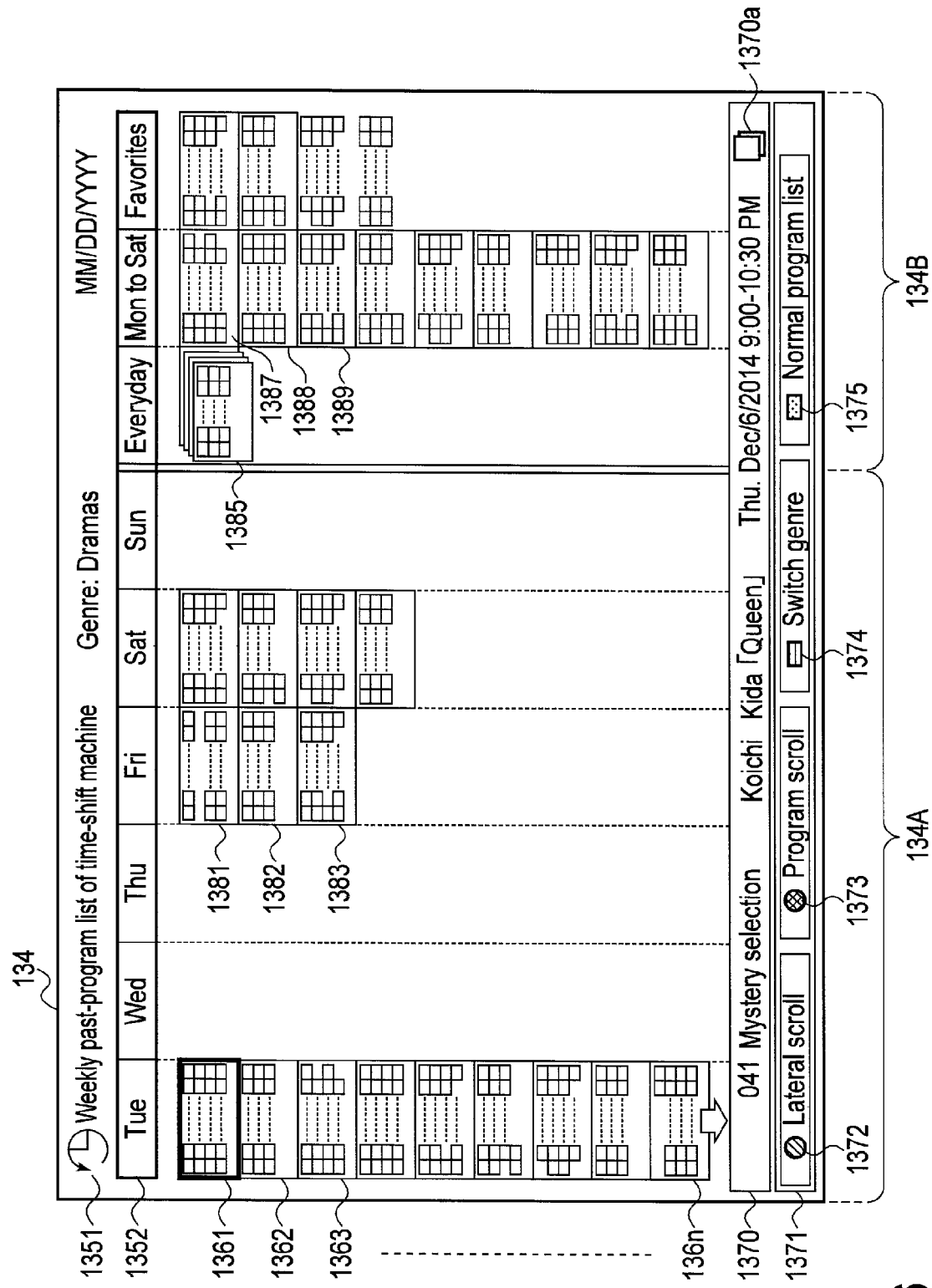
F I G. 6

FIG. 10

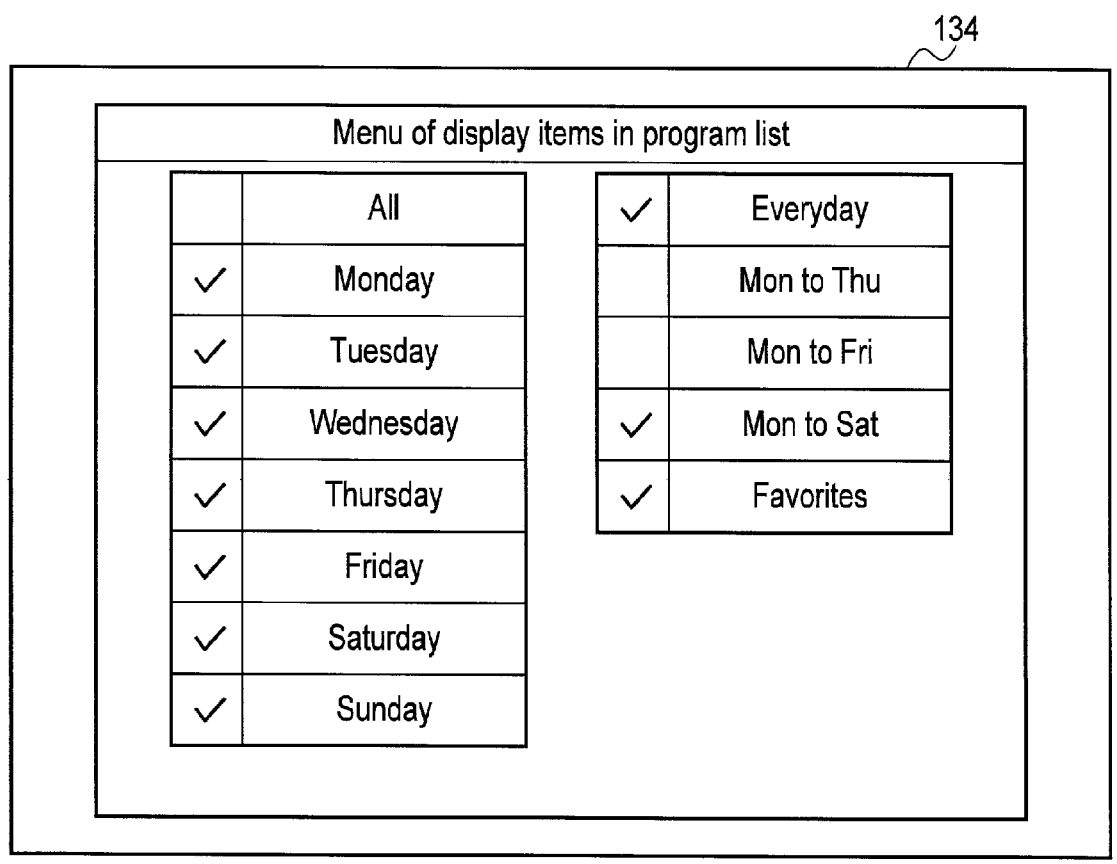
F I G. 12

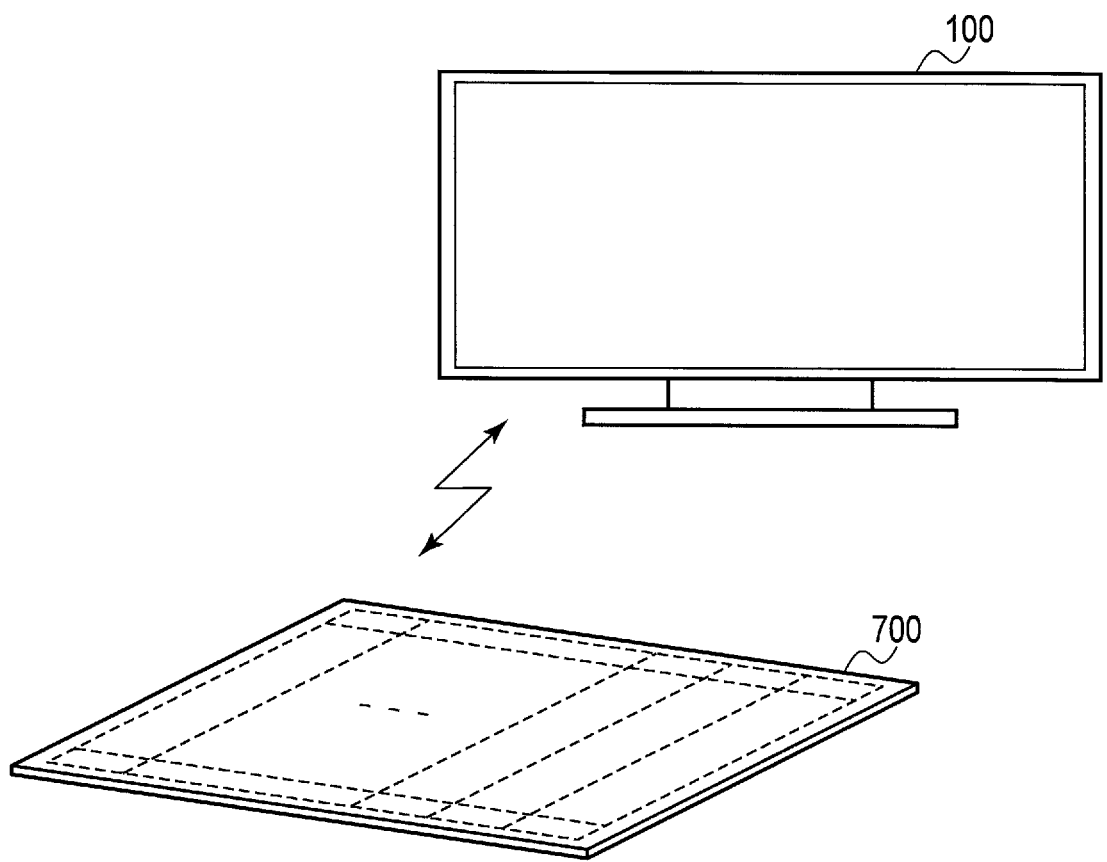
F I G. 13

FIG. 14

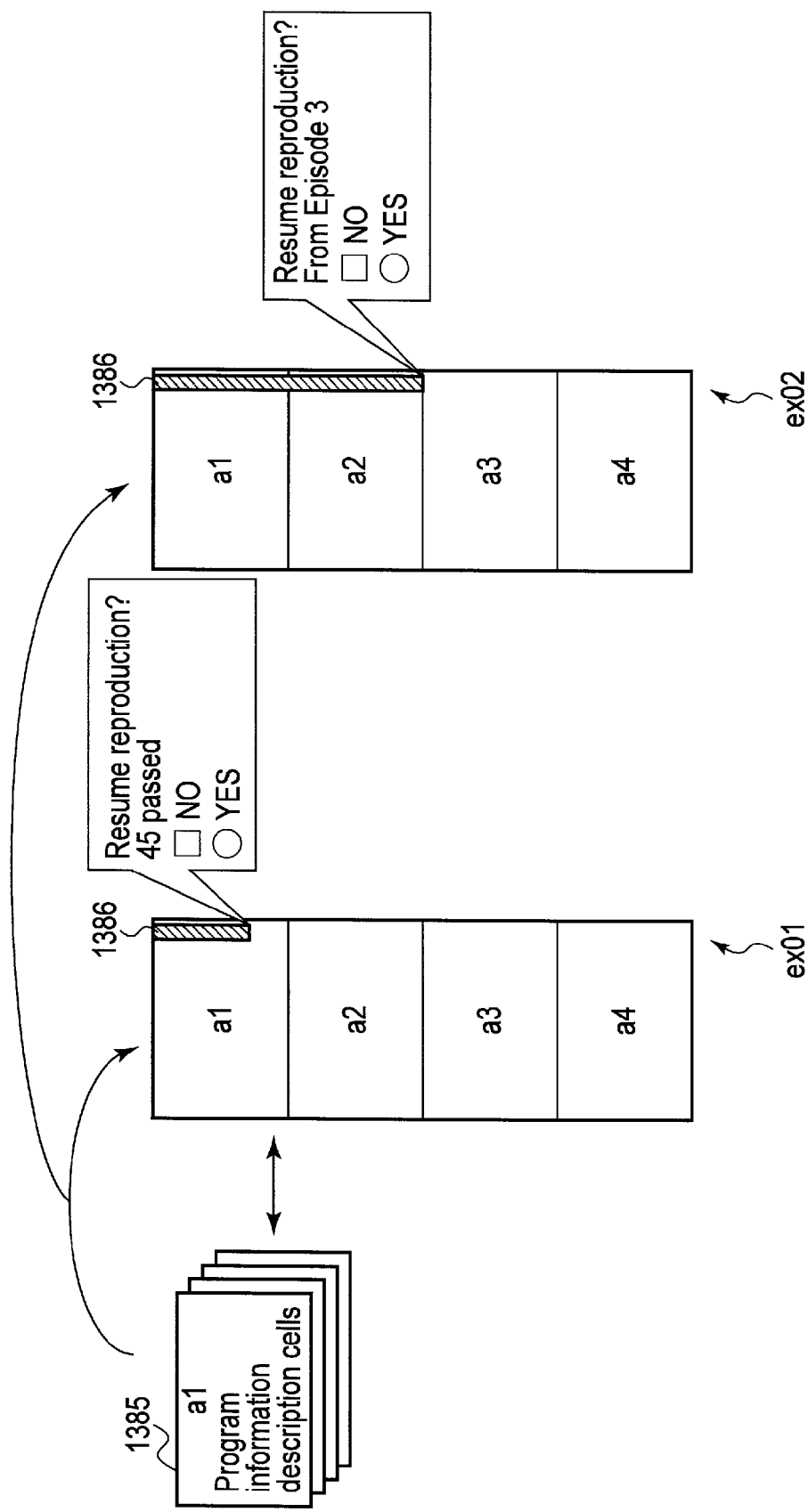
F I G. 16

ELECTRONIC APPARATUS AND DISPLAY METHOD BY ELECTRONIC APPARATUS

CROSS-REFERENCE TO RELATED APPLICATIONS

This application is based upon and claims the benefit of priority from Japanese Patent Application No. 2015-008036, filed Jan. 19, 2015, the entire contents of which are incorporated herein by reference.

FIELD

Embodiments described herein relate generally to an electronic apparatus and a display method by the electronic apparatus.

BACKGROUND

Television apparatuses to which a high-capacity recording and reproducing device is connectable have been marketed. The television receiver can record broadcast programs on the recording and reproducing device over a plurality of channels for a plurality of days. When programs are recorded on the recording and reproducing device by the television apparatus over a plurality of channels for a plurality of days, a large number of programs are stored in the recording and reproducing device.

When a large number of programs are recorded on the recording and reproducing device, the user has difficulty in searching for the desired program to be viewed.

To overcome this inconvenience, apparatuses which classify programs based on genres by using program information have been suggested. This apparatus allows the user to select the method for displaying a program list from the menu. The program list may be called a program table. If the user instructs the television apparatus to display programs based on genres, a list of genres (sport, news, dramas, etc.,) is displayed. If the user specifies the desired genre, for example, sport, from the list of genres, a list of program names related to sport is displayed. The user can specify and view the desired program.

As described above, in television apparatuses (electronic apparatuses) which can record and reproduce a large number of programs, how easily the user can find the program to be reproduced and viewed from the large number of programs recorded on the recording device is an issue. The means or methods for allowing the user to easily detect the program to be viewed from a large number of programs recorded on the recording device are required to be further improved.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 schematically shows an example of a configuration of a television apparatus to which an embodiment is applied.

FIG. 4 is a flowchart shown for explaining a typical example of an operation of an embodiment.

FIG. 6 shows an example in which a past-program list related to dramas is displayed according to an embodiment.

FIG. 10 shows a display example of a normal program list displayed when operation button 1375 of FIG. 6 is operated.

FIG. 12 shows an example of a menu for setting a display form of a program list.

FIG. 13 shows an embodiment in which a mobile device is used as a display device.

FIG. 14 shows another example of the display form of a program list.

FIG. 16 shows an example of an operation when resume reproduction is performed based on control of a reproduction form controller.

DETAILED DESCRIPTION

Figure 2:
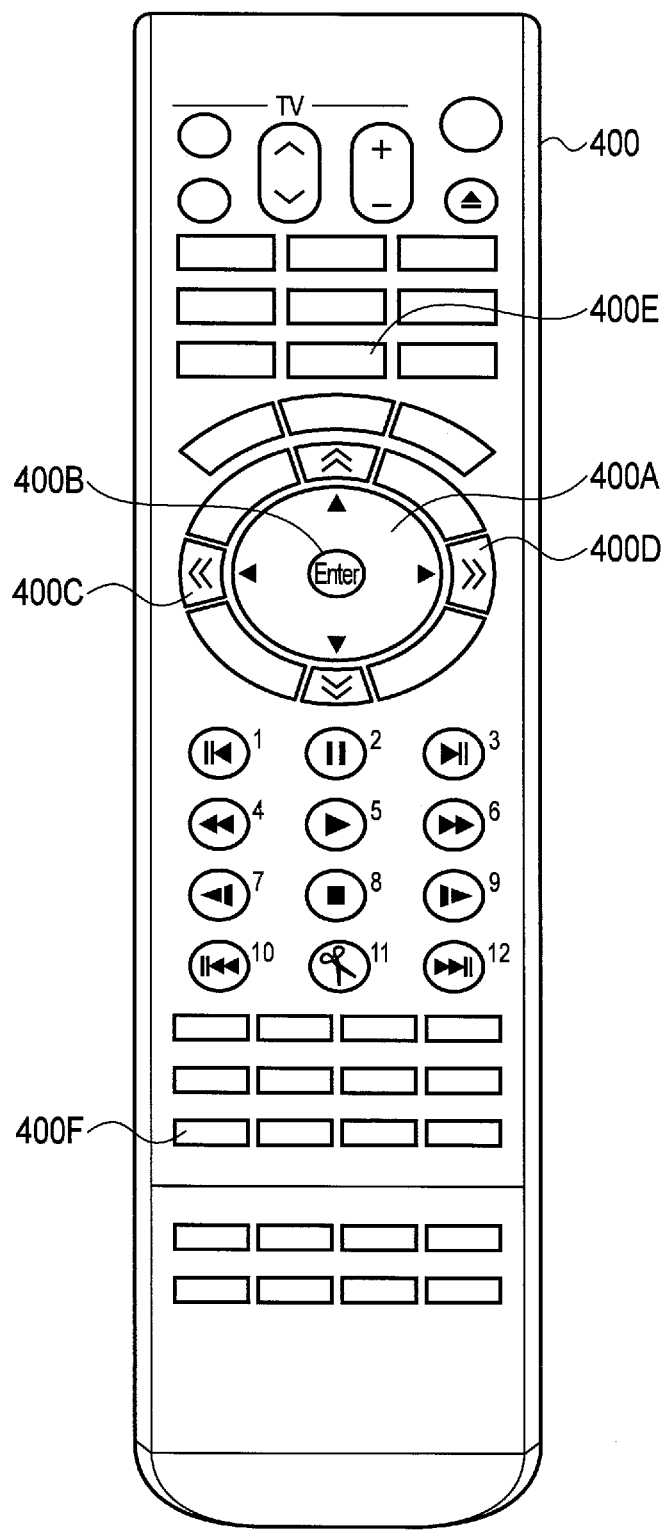
FIG. 2 is a plan view showing an example of a remote controller.

Various embodiments will be described hereinafter with reference to the accompanying drawings.

The embodiments can provide an electronic apparatus and a display method by the electronic apparatus. The electronic apparatus and the display method allow the user to further easily find the desired program from a large number of programs recorded in a recording and reproducing device.

For example, according to one embodiment, a genre classification unit is provided to classify a plurality of programs based on genres with reference to program information. Further, a day classification unit is provided to classify the classified programs based on broadcast days. A display form controller is provided to process data for displaying a program list of a specified genre. The display form controller sorts (or arranges) program information description cells of the programs classified based on days into display areas based on days on a display device. When a program information description cell of a display area of a specified day is scrolled, the display form controller processes data so as to display program information description cells of display areas of days other than the specified day in a still state.

The embodiments are explained in more detail below.

FIG. 1 is a block diagram showing an example of a configuration of a television apparatus 100 to which an embodiment is applied. The television apparatus comprises, for example, a digital tuner device 102 including a plurality of tuners receiving scrambled digital terrestrial broadcast signals. The digital tuner device 102 may include, for example, a tuner (not shown) for receiving a BS/CS digital broadcast.

The broadcast program signals received by the tuner device 102 are input to a transport stream (TS) processor 122. Transport streams of a plurality of channels (CH) are re-multiplexed into a single TS. The multiplexed TS includes a packet sequence of the broadcast program of each channel. Identification information for channel/packet identification is added to the packets of each channel. The multiplexed TS is input to a memory device 111. Among the transport streams input to the TS processor 122, packets including control information are input to a controller 200 and processed.

The memory device 111 includes, for example, a hard disk drive and an optical disk recording/reproducing device. The optical disk includes, for example, a digital versatile disk (DVD) and a Blu-ray disk (BD <registered trademark>).

The packets transferred from the TS processor 122 to the controller 200 convey various tables describing information necessary to reproduce a broadcast program. The tables include, for example, an Entitlement Control Message (ECM) which is encrypted information of a broadcast program, an Event Information Table (EIT) which is a table describing event information such as the program name, casts and start time, an electronic program guide (EPG), and a program map table (PMT).

The image data included in a packet is encoded according to, for example, the Moving Picture Experts Group (MPEG) standard or the Advanced Video Coding (AVC) standard. The audio data in the audio packet is encoded according to, for example, the Pulse Code Modulation (PCM) standard, the Dolby (registered trademark) standard or the MPEG standard.

Among the packets separated by the TS processor 122, packets including audio data are input to an audio decoder 123 and decoded according to the encoding standard. The audio data decoded by the audio decoder 123 is subjected to a synchronization process and volume adjustment in an audio data processor 124 and is supplied to an audio output unit 125. The audio output unit 125 executes a stereo separation process based on a speaker system and supplies the output to a speaker 126.

Among the packets separated by the TS processor 122, packets including image data are input to an image decoder 131 and decoded by the image decoder 131 according to the encoding standard. The image data decoded by the image decoder 131 is subjected to a synchronization process, brightness adjustment and color adjustment in an image data processor 132. The output from the image data processor 132 is supplied to an image output unit 133. The image output unit 133 is configured to multiplex data, figures and program lists etc., from the controller 200 on a main image signal. Furthermore, the image output unit 133 sets the scale, the resolution, the number of lines and the aspect ratio in accordance with a display device 134 with respect to the output image signal and outputs the output image signal to the display device 134.

The audio packets and the image packets of paid programs may be encrypted. In such a case, a processing system for decrypting the encryption using key information is present. However, the system is omitted here.

The controller 200 includes a central processing unit (CPU) 201, an operation command processor 202, a communication controller 203, a device management unit 204, a display processor 212 and a memory 211. The controller 200 further includes an Electronic Program Guide (EPG) data acquisition unit (not shown).

The controller 200 includes a program information processor 231 and an automatic recording device 232. The program information processor 231 is configured to classify and sort program information into various forms. The detail of the program information processor 231 is explained later. The automatic recording device 232 may be called a time-shift recording device. The automatic recording device 232 is configured to control the memory device 111 and record broadcast programs in the memory device 111 over a plurality of channels for a plurality of days. The controller 200 comprises a reproduction form controller 233. The reproduction form controller 233 is configured to control the reproduction operation of programs recorded by time-shift recording. The reproduction operation is explained later.

The CPU 201 adjusts the whole operation sequence of the controller 200. The operation command processor 202 is configured to analyze an operation command input from outside and reflect an operation corresponding to the command on the television apparatus 100. The device management unit 204 is configured to recognize and manage device identification data of a mobile device 700 and a remote controller 400 proving the controller 200 with an operation signal.

A display processor 212 is configured to control the image signal displayed in the display device 134 via the image output unit 133 as a whole. The display processor 212 is configured to adjust the resolution, display size and display area of the image signal. The display processor 212 is configured to supply a program list image signal prepared by using EPG data and a menu image signal prepared in the controller 200 based on an operation signal to the image output unit 133.

In the controller 200, various types of data and applications can be stored in the memory 211. The memory 211 includes a nonvolatile memory and stores address data for communication and device unique information (TV unique ID).

The communication controller 203 is configured to communicate with outside and take in operation commands, data and content. The taken content and data can be stored in, for example, the memory device 111 or the memory 211. The communication controller 203 is configured to transmit data, content, etc., from the television apparatus 100 to outside.

The communication controller 203 is connected to a wireless communication transmission/reception unit (communication device) 113, a wired communication transmission/reception unit 112 and a LAN transmission/reception unit 115. The wired communication transmission/reception unit (communication device) 112 is configured to transmit/receive data to/from a remote server or a home server through the Internet. The wireless communication transmission/reception unit 113 is configured to transmit/receive data to/from the mobile device 700 and is used for short-range (or near filed) communication. The LAN transmission/reception unit 115 is connected to, for example, another television apparatus, a recording and reproducing device, a set-top box and a server at home. The television apparatus 100 is configured to receive an operation signal from the remote controller 400 via an infrared reception unit 114, for example.

The mobile device 700 is configured to remotely control the television apparatus 100. The mobile device 700 is configured to access a server through a base station (not shown) and the Internet. The mobile device 700 is configured to download various types of applications and game software as well as content provided by a server and transmit them to the controller 200 via the wireless communication transmission/reception unit 113.

The mobile device 700 is configured to transmit information for obtaining content (for example, the Web server address, mail address and network address) to the controller 200 via the wireless communication transmission/reception unit 113.

When content, an application or game software is transmitted from the mobile device 700, the communication controller 203 of the controller 200 functions. The communication controller 203 stores the received content in the memory 211. The content may be stored in the memory device 111 in accordance with an operation command or may be automatically stored in the memory device 111. The memory device 111 may record the received content in, for example, a hard disk. In the hard disk, the content is managed as a content file.

For example, a menu image signal and a program list image signal for display are stored in and managed by the display processor 212. When a menu or a program list is displayed, menu screen data or a program list image signal is read from a data storage unit (a memory or a hard disk) based on control of the display processor 212 and is supplied to the image output unit 133. In this manner, a menu screen or a program list screen is displayed on the display device 134.

The menu image signal and the program list image signal for display may be transmitted to the mobile device 700. When the mobile device 700 requests the menu image signal or the program list image signal, the display processor 212 may transmit the menu image signal or the program list image signal to the mobile device 700.

The mobile device 700 is configured to display the menu image signal and the program list image signal on the touchpanel screen. The user touches an operation button displayed on the touchpanel (pointing device) screen to send an operation instruction signal to the television receiver 100.

FIG. 2 shows an external appearance of the remote controller 400. The remote controller 400 mainly comprises a cursor key 400A, an enter key 400B, a page return key 400C, a page forward key 400D and a time-shift key 400E.

The cursor key 400A is provided to shift the specified area (focus) in the program list or the jump table for specifying time and date, etc., explained later. The enter key 400B is provided to determine the specified area. The page return key 400C and the page forward key 400D are provided to change the display range in the program list or the jump table for specifying time and date.

The time-shift key 400E is provided to display a list of programs which have been simultaneously recorded as a past-program list. For example, a past-program list can be displayed on the display screen of the display device 134 by pressing the time-shift key 400E. Here, the apparatus is configured to reproduce the program specified by the cursor on the display screen and enter a time-shift mode.

The remote controller 400 may further comprise a button captioned with "program list" for instructing a program list to be displayed.

Figure 3:
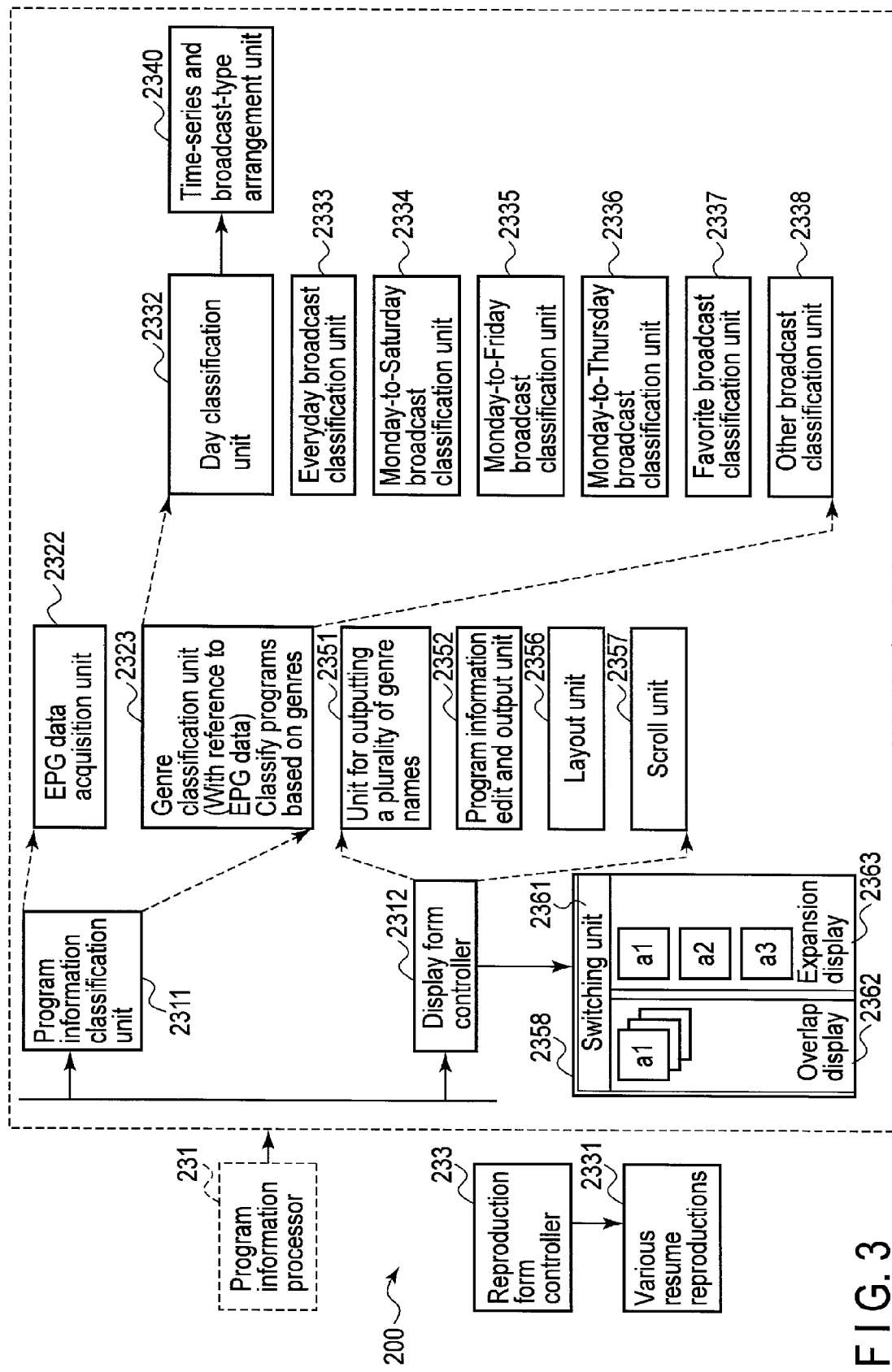
FIG. 3 is a configuration explanatory diagram showing an example of a functional block provided in a program information processor 231 of FIG. 1.

FIG. 3 shows a functional block provided in the program information processor 231 shown in FIG. 1. The program information processor 231 is configured to generate a classification table on which a large number of programs recorded on the recording device 111 are classified.

The program information processor 231 includes a program information classification unit 2311. The program information classification unit 2311 is configured to classify programs based on genres by using program information. The program information processor 2311 comprises an EPG data acquisition unit 2322 which obtains EPG data and a genre classification unit 2323. EPG data is information of programs recorded in the memory device 111. The program information allows display of a list of past broadcast programs. The genre classification unit 2322 classifies programs based on genres, referring to EPG data. The genres are determined from program names included in program information or genre specification description.

The genre classification unit 2323 comprises, for example, a day classification unit 2332 which classifies programs broadcast on a single day, an everyday broadcast classification unit 2333, a Monday-to-Saturday broadcast classification unit 2334, a Monday-to-Friday broadcast classification unit 2335, a Monday-to-Thursday broadcast classification unit 2336, a favorite broadcast classification unit 2337 and an other broadcast classification unit 2338. The separation of days, Monday to Sunday, is not limited to the above example. FIG. 3 is merely an example. The separation of days, Monday to Sunday, may be arbitrarily set by the designer.

The day classification unit 2332 classifies the programs classified based on genres according to the broadcast days (in the order of Monday to Sunday). A time-series and broadcast-type arrangement unit 2340 sets an arrangement order (arrangement priority order) for the programs classified into each day with respect to the program data. For example, program PA, program PB, program PC, . . . , are classified as a group belonging to Tuesday in sport. When program PA, program PB, program PC, . . . , are different in their broadcast hours, the time-series and broadcast-type arrangement unit 2340 arranges the programs in the order of programs broadcast earlier. However, when a plurality of programs of different channels are present in the same broadcast type (for example, digital terrestrial broadcasting), the programs are arranged in the order from, for example, lower to higher channel numbers.

When the broadcast types of program PA, program PB, program PC, . . . , are different such as the digital terrestrial broadcasting, the Broadcast Satellite (BS) broadcasting and the Communication Satellite (CS) broadcasting, the programs are arranged in the order of, for example, the digital terrestrial broadcasting, the BS broadcasting and the CS broadcasting.

In this example, the programs which belong to Tuesday in sport are sorted in the order of sort key 1: broadcast type (terrestrial broadcasting>BS broadcasting>CS broadcasting from higher to lower priorities), sort key 2: channel number (in ascending order) and sort key 3: program start time (in chronological order) from higher to lower priorities. The programs are arranged according to this order from above.

The arrangement order (arrangement priority order) can be arbitrarily switched or set by a means for setting the priority order. Thus, the arrangement order is not limited to the above example.

The program information processor 231 further includes a display form controller 2312. The display form controller 2312 sets the display specification for displaying program information of programs classified by the program information classification unit 2311 on the display device 134. The display form controller 2312 comprises, for example, a unit 2351 for outputting a plurality of genre names, a program information edit and output unit 2352, a layout unit 2356 and a scroll unit 2357.

The unit 2351 for outputting a plurality of genre names is a functional block for displaying a plurality of genre names. The user can select the display of the program list of the desired genre when a plurality of genre names are displayed on the display device 134.

The program information edit and output unit 2352 is configured to edit program information of each program into shortened guide description, prepare guide description of each program as a program information description cell and output it. The program information description cell is used to form a program list.

The layout unit 2356 generates a format for displaying a program list on the display device 134. This generation allows the program list to be displayed in the following ways:

The program information description cells of a plurality of programs classified based on days are sorted into display areas based on days on the display device and are displayed in the display areas;

When a plurality of program information description cells are present in the display area of a day, the cells are closely displayed; in other words, the cells are displayed without spaces between the cells;

When a group of program information description cells in the display area of the specified day is scrolled, program information description cells in the display areas of the other days are displayed in a still state; and The program list is displayed in a state where the number of characters described in one program information description cell is edited so as to fit within the predetermined number of lines.

The program information edit and output unit 2352 edits the number of characters described in one program information description cell so as to fit within the predetermined number of lines. When the program information description cells in the display area of the specified day are scrolled, the scroll unit 2357 keeps the program information description cells in the display areas of the other days in a still state.

Figure 8:
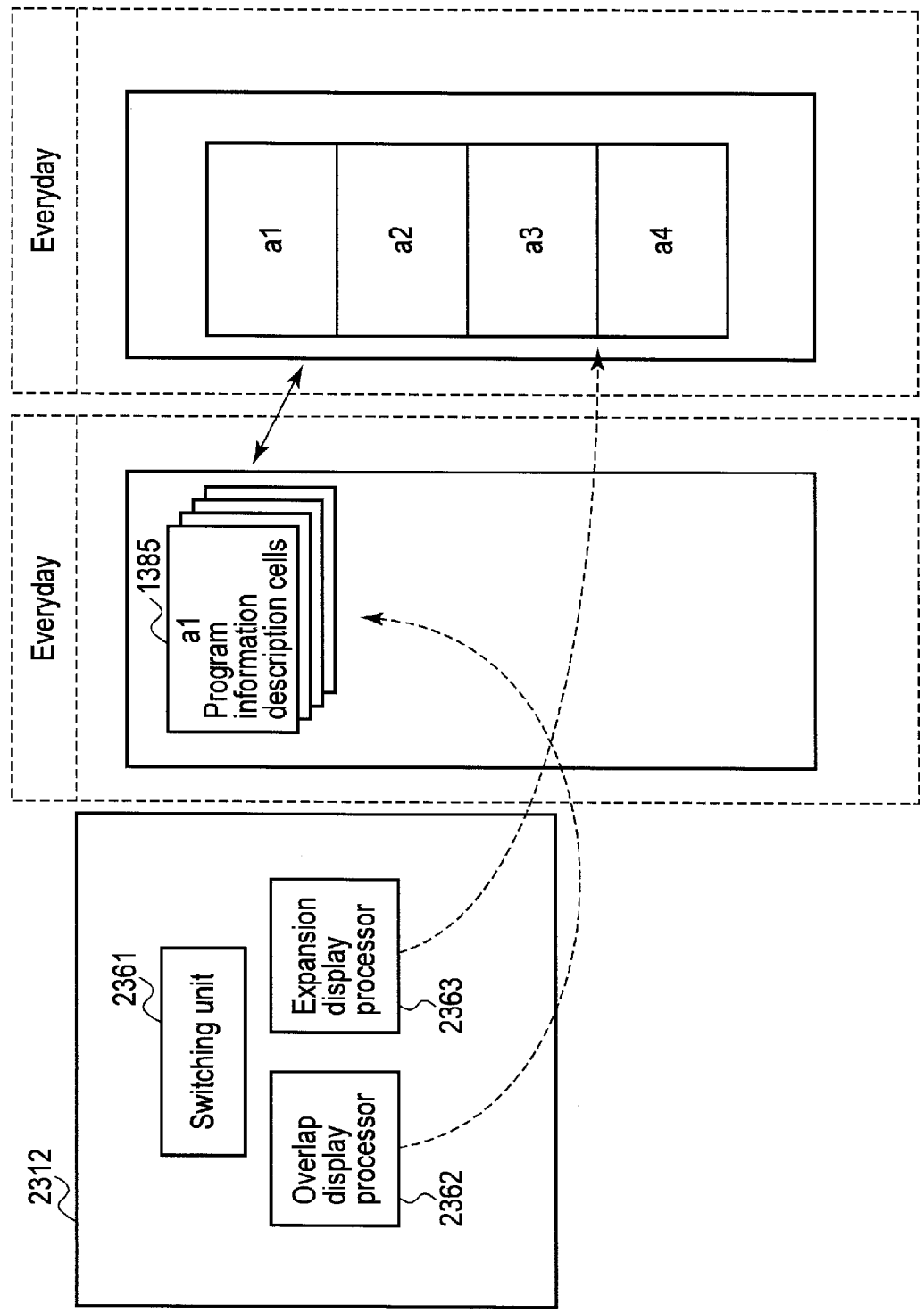
FIG. 8 shows an example of a configuration of a display form controller 2312 and an example of its operation.

The display form controller 2312 comprises a switching controller 2358. The switching controller 2358 comprises an overlap display processor 2362 which, when a plurality of program information description cells are present in connection with the same series programs, displays the program information description cells by overlapping them, an expansion display processor 2363 which displays the program information description cells by expanding the overlapped state, and a switching unit 2361 which switches the display state between the overlapped state and the expanded state. (The overlapped state and the expanded state of program information description cells are shown in FIG. 8 as an example.)

The reproduction form controller 233 is present in parallel with the program information processor 231. The reproduction form controller 233 is configured to execute various types of resume reproductions. The reproduction form controller 233 comprises a controller 2331 for controlling various types of resume reproductions. For example, the reproduction form controller 233 is configured to perform, for example, an operation mode for reproducing a program always from the beginning or a mode for reproducing a program which has been partially viewed from a middle position (the start position of the part which has not been viewed).

FIG. 4 is a flowchart shown for briefly explaining an example of an operation of the program information processor 231. For example, the memory device 111 of the present embodiment is configured to store programs over a plurality of channels for approximately one to four weeks. The capacity of the memory device 111 may be increased to store programs over a plurality of channels for approximately two to three months. The recorded programs can be automatically deleted in order from an older program. A program particularly instructed by the user to be deleted is deleted. However, when the user particularly instructs a program to be saved, the program may be saved for more than four weeks without deletion.

When an old program has been deleted, the past-program list stored in the memory device 111 needs to be updated. The program information processor 231 obtains, for example, program information stored in the memory device 111 (steps SA1 and SA2). The program information may be called EPG data.

Subsequently, programs are classified based on genres by using the program information (step SA3). Further, programs of each genre are classified into programs of Monday to Sunday. In this manner, tables of programs sorted by the classification units 2332 to 2338 explained in FIG. 3 are prepared. A table in which programs broadcast every day are assembled is formed (step SA5). For example, a table in which programs broadcast once from Monday to Saturday are separated from programs broadcast a plurality of times from Monday to Saturday is formed (step SA6). Moreover, a table of programs specified as favorite programs is formed (step SA7). The information tables of updated program lists are stored in a medium of the memory device 111 again (step SA8). For example, favorite programs are detected on predetermined conditions from viewing history and recording history. Individual favorite programs are displayed in chronological order. However, the programs detected from viewing history and recording history are configured to be excluded from the next search conditions. The predetermined conditions can be set in various ways. For example, the user may specify genres or casts in advance for the conditions.

Figure 5:
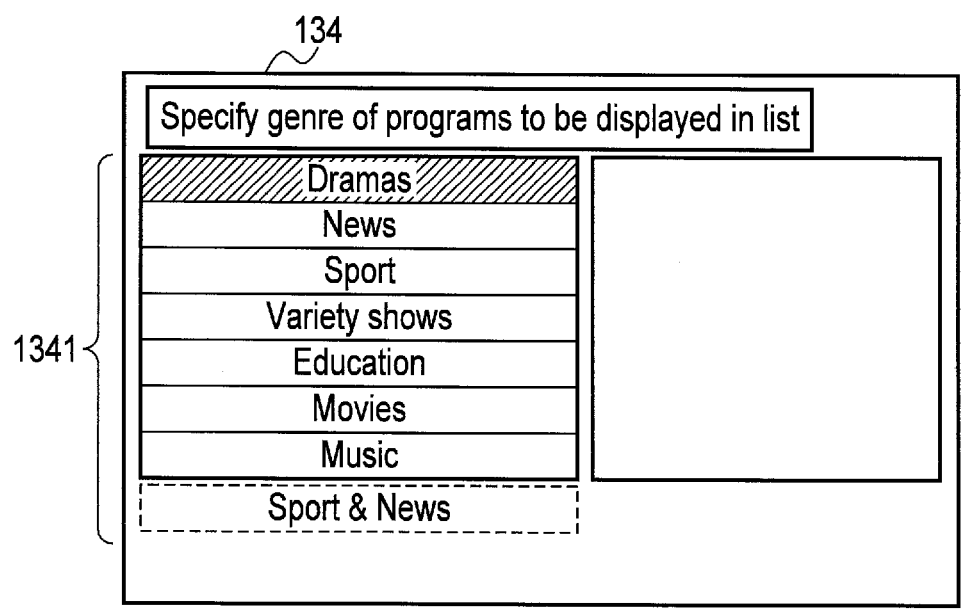
FIG. 5 shows an example of a genre selection menu for performing genre selection before displaying a program list.

FIG. 5 shows an example of a menu for performing genre selection before displaying a list of programs recorded by time-shift recording. For example, when the user presses a button captioned with "program list" on the remote controller 400, the menu of FIG. 5 is displayed. This menu displays, for example, the following message: "specify genre of programs to be displayed in list". Various genre names are displayed in display area 1341.

For example, the user moves the cursor by using the remote controller 400, selects one of the genre names "dramas", "news", "sport", "variety shows", "education", "movies" and "music" and presses the enter button. In the example of FIG. 5, the genre name "dramas" is specified.

The above example is shown as a menu for selecting a single genre. However, an area in which a plurality of genres are (for example, combination of sport and news or combination of dramas and movies is) set may be displayed in display area 1341 of the menu.

FIG. 6 shows a state in which a list of programs related to the genre "dramas" is displayed. In area 1351 in the upper part of the display device 134, for example, the description "weekly past-program list of time-shift machine" is displayed as the title. In addition, the description "genre: dramas" is displayed. Further, the description of the current date is displayed.

The screen of the display device 134 is mainly divided into a left area 134A and a right area 134B for ensuring column areas. In the columns of the left area 134A, program information description cells of programs broadcast on only each day are arranged. In the columns of the right area 134B, program information description cells of programs having continuousness between days are arranged.

In area 1352, the descriptions of days "Tue", "Wed", "Thu", "Fri" and "Sat" are laterally arranged and displayed (from left to right on the screen). In addition, the descriptions "everyday", "Mon to Sat" and "favorites" are laterally arranged and displayed. If days are classified into small groups such as "Mon to Fri", "Mon to Sat" and "everyday" in addition to the group of each single day, the number of columns arranged laterally is increased. Therefore, as a modification example, programs broadcast twice or more a week may be displayed in one column with the description "twice or more a week". In this manner, it is possible to obtain an effect in which the number of columns is decreased.

In FIG. 6, the display of days starts from Tuesday. However, Monday can be also displayed by controlling the remote controller. The column of "Mon" is displayed when the user moves the cursor to a part of area 1352 and operates the left-arrow button by using the remote controller 400.

In the area of the column of each day, program information description cells of programs classified into the day are arranged. For example, in the column of "Tue", program information description cells 1361, 1362, 1363, . . . , 136n related to programs broadcast on only Tuesday are arranged in series from the upper part to the lower part of the screen. In the column of "Fri", program information description cells 1381, 1382 and 1383 of programs broadcast on only Friday are arranged in series from the upper part to the lower part of the screen. Although the columns of "Wed", "Thu" and "Sun" are blank, their program information description cells are omitted.

In the column of "everyday", program information description cells (overlap program information description cells) 1385 of programs broadcast everyday with continuousness of days are arranged. In the column of "Mon to Sat", for example, program information description cells 1387, 1388 and 1389 of programs broadcast with continuousness for two or three days from Monday to Saturday are arranged. In this example, the column of "Mon to Sat" is displayed. However, of course, a classification process may be performed with respect to programs having continuousness of days such as "Mon to Fri", "Mon to Thu" and "Wed to Fri", and the column of each group may be provided. However, if a large amount of groups are prepared by classification with respect to "Mon to Sat", the number of columns is increased sideways on the display device. The program information description cells are reduced in size. Thus, the groups need to be arbitrarily set.

In the present embodiment, a program list is generated for each genre. The program information description cells which form each program list allow programs from Monday to Sunday for a week or more to be displayed on a single screen. The program information description cells are arranged in series from a program whose broadcast start time is earlier. For example, if program PA, program PB, program PC, . . . are different in broadcast types such as the digital terrestrial broadcasting, the BS broadcasting and CS broadcasting, the programs are arranged in the order of, for example, the digital terrestrial broadcasting, the BS broadcasting and the CS broadcasting. This arrangement order is set by the time-series and broadcast-type arrangement unit 2340.

By the above arrangement of program information (program information description cells), it is possible to display programs having a specified genre from Monday to Sunday for a week or more (for example, approximately one or two months) on a single screen. Thus, the user can easily find a desired program to be viewed.

In an embodiment, to enable the user to easily look through a list, the program information description cells are arranged from the upper part of the screen without leaving spaces between the cells up and down in the column of each day. This arrangement process is executed by the layout unit 2356. This process is a feature of the present embodiment.

In the present embodiment, if program information is described in program information description cells, the number of characters described in each cell is edited so as to fit within the predetermined number of lines. This editing process is conducted to allow as many program information description cells as possible to be arranged in the column. This editing process is performed by the program information edit and output unit 2352. This editing process is another feature of the present embodiment. However, the user may want to know the detail of program information.

In such a case, the user can know the detail of program information by moving the cursor to the desired program information description cell and looking at area 1370 in the lower part of the screen. In FIG. 6, the frame of program information description cell 1361 is shown by a thick line as the cursor is positioned on the cell. To show the position of the cursor, the color of the specified program information description cell may be differentiated from that of the other part. In the present embodiment, when the cursor is positioned on a program information description cell forming a program list, the user can look at the detail of program information described in the cell as shown in area 1370 in the lower part of the screen. The program information includes the broadcast channel, the broadcast type, the name and the broadcast time and date of the program. When the description amount in area 1370 is large, the area may be automatically scrolled.

When a plurality of cells are overlapped as program information description cells 1361, a mark 1370a indicating overlapped display is displayed in area 1370. When cells are displayed in an overlapped state like program information description cells 1361, for example, a soap opera is broadcast every Tuesday in the same channel. When the soap opera is broadcast on a different day on a rerun, overlapped display is performed. However, a program broadcast on a rerun is preferably recorded if the recording of the original program has been missed.

Under area 1370, area 1371 is ensured. In area 1371, button information (marks or designs related to buttons) is described with messages for guiding operations. Area 1371 shows that: a lateral scroll operation can be obtained by pressing button 1372 of the remote controller 400; a program scroll operation can be obtained by pressing button 1373; the genre of programs to be displayed as a program list can be switched by pressing button 1374; and a normal program list can be displayed by pressing button 1375. For example, a lateral scroll operation can be used to display the column of "Mon". At this time, for example, the cursor is positioned in the place of "Tue". Buttons 1372, 1373, 1374 and 1375 are distinguished from each other by, for example, colors. Various embodiments can be applied to the method for distinguishing the buttons. For example, the buttons may be differentiated by numbers, characters, marks or shapes corresponding to the buttons of the remote controller.

As explained above, in display area 1371 which is different from the display areas of program information description cells, specific buttons of the remote controller 400 are displayed with messages indicating the operation states (behaviors) to be obtained in the apparatus by operating the buttons. In this manner, the operability is improved. In addition, in display area 1371, a switching button for switching the arrangement order of program information description cells may be displayed with the guidance message.

In the above embodiment, this specification explains that a past-program list is displayed for each single genre. However, as a different embodiment, of course, a program list including a plurality of genres (first and second genres) can be simultaneously displayed. In this case, for example, an area in which a plurality of genres (for example, sport and news or dramas and movies) are set is displayed in display area 1341 of the menu of FIG. 5.

According to the above embodiment, the genre classification unit 2323 classifies a plurality of programs based on genres, referring to program information. The day classification unit 2332 classifies the classified programs based on broadcast days. The display form controller 2312 sorts (or arranges) program information description cells of the programs classified based on days into display areas based on days on the display device. The display form controller 2312 edits or divides the number of characters described in one program information description cell so as to fit within the predetermined number of lines and displays the program information description cell. The information of the description may be only a program name. When a plurality of program information description cells are present in the display area of a day, the cells are displayed without spaces between the cells. In this manner, a number of program information items can be provided in each column.

When one of program information description cells is specified by the cursor in a program list, the detailed program information of the program corresponding to the specified program information description cell is displayed in display area 1370 which is different from the display area of the program information description cell. In display area 1371 which is different from the display areas of program information description cells, buttons of the remote controller 400 can be displayed with messages indicating the operation states (behaviors) to be obtained by operating the buttons.

In FIG. 6, the program list is displayed in a display mode for a program list based on a single specified genre. However, the electronic apparatus of the present embodiment can obtain a display mode for a program list including the first and second genres (a plurality of genres). As stated above, in the present embodiment, the program information classification unit 2311 and the display form controller 2312 effectively control data to allow the user to easily search for a past program.

Figure 7:
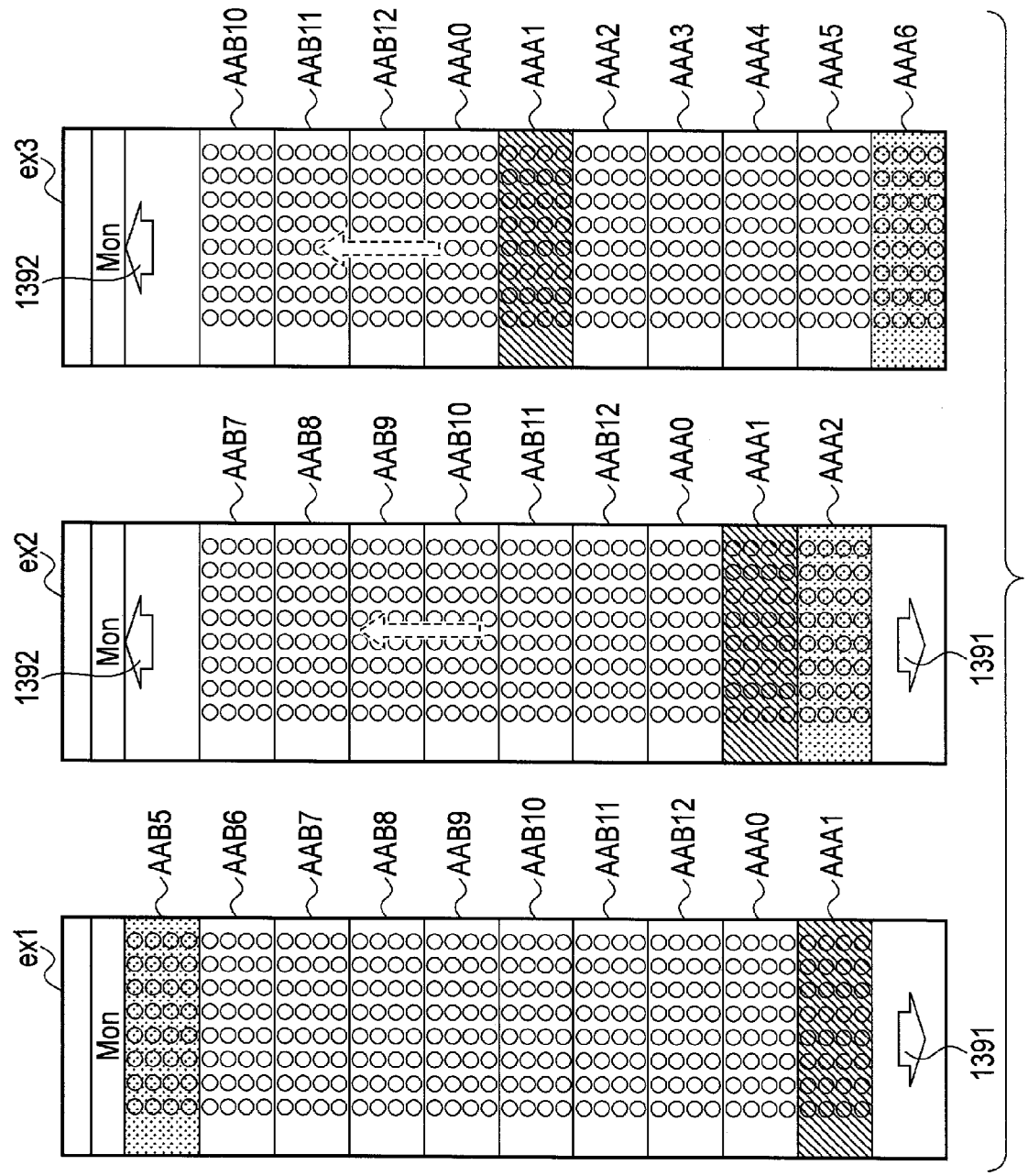
FIG. 7 is shown for explaining an example of an operation for scrolling a plurality of program information description cells of a column up and down according to an embodiment.

FIG. 7 shows an example in which a plurality of program information description cells of the column of "Mon" are scrolled up and down. (In each cell, program information which has been shortened by editing is described.) Example ex1 of FIG. 7 shows a state in which program information description cells AAB5 to AAB12 and program information description cells AAA0 and AAA1 are displayed.

In example ex1 of FIG. 7, arrow image 1391 indicates that the down-arrow button of the remote controller 400 can be operated; in other words, a program information description cell is present in the lower part of the screen. If, in example ex1 of FIG. 7, the down-arrow button of the remote controller 400 is pressed once, the program information description cells move upward on the screen by one block as a whole from the state of example ex1 and move to the state of example ex2. In short, program information description cells AAB7 to AAB12 and program information description cells AAA0, AAA1 and AAA2 are displayed. In this case, program information description cell AAB6 is hidden by arrow image 1392.

In example ex2 of FIG. 7, arrow images 1391 and 1392 suggest that a program information description cell is present in the lower part and upper part of the screen, respectively.

If the user continues to press the down-arrow button of the remote controller 400 from the state of example ex2 of FIG. 7, program information description cells AAB10 to AAB12 and program information description cells AAA0, AAA1, AAA2, . . . , AAA6 are displayed. In the place of the undermost program information description cell AAA6, no arrow image is displayed. Program information description cell AAA6 is colored in, for example yellow. Thus, the color of program information description cell AAA6 is changed to a different color from the other program information description cells. This state indicates that the last program information description cell arranged in the downward direction is program information description cell AAA6. Thus, when the scroll move has reached the limitation (in a state where the screen cannot be further scrolled), the color of the last program information description cell is differentiated from that of the other cells. In this manner, the user-friendliness is improved.

As described above, when the program information description cells in the display area of the specified day (Monday in the above example) are scrolled, the program information description cells in the display areas of the other days are displayed in a still state by data control of the display form controller 2312. Thus, only the cells of the operated column are scrolled. In this manner, the information images of the other columns can be viewed anytime. This is another feature of the present embodiment.

FIG. 8 further shows an example of the configuration of the display form controller 2312. When a plurality of program information description cells describing program information related to the same-series programs are present, the display form controller 2312 is configured to switch the display form by using the overlap display processor 2362, the expansion display processor 2363 and the switching unit 2361. The example of FIG. 8 shows the portion of program information description cells (overlap program information description cells) 1385 of FIG. 6. As program information description cells 1385, a plurality of program information description cells are overlapped and displayed. When a plurality of program information description cells describing program information related to the same series programs are generated, the overlap display processor 2362 performs overlapping display. For example, with regard to news programs which have the same program name and are broadcast in the same period everyday, a large number of program information description cells are generated for a month. In this case, overlapping display allows the display area to be more effectively used. The user may want to look at not only the front program information but also the program information of the day before or the day before yesterday. In such a case, the user can expand and look at a plurality of program information description cells (for example, a1 to a4) by moving the cursor onto program information description cells 1385 and clicking the specific button. When the user clicks the specific button again in a state where the program information description cells are expanded, the user can return the display state to the overlapped state.

Figure 9:
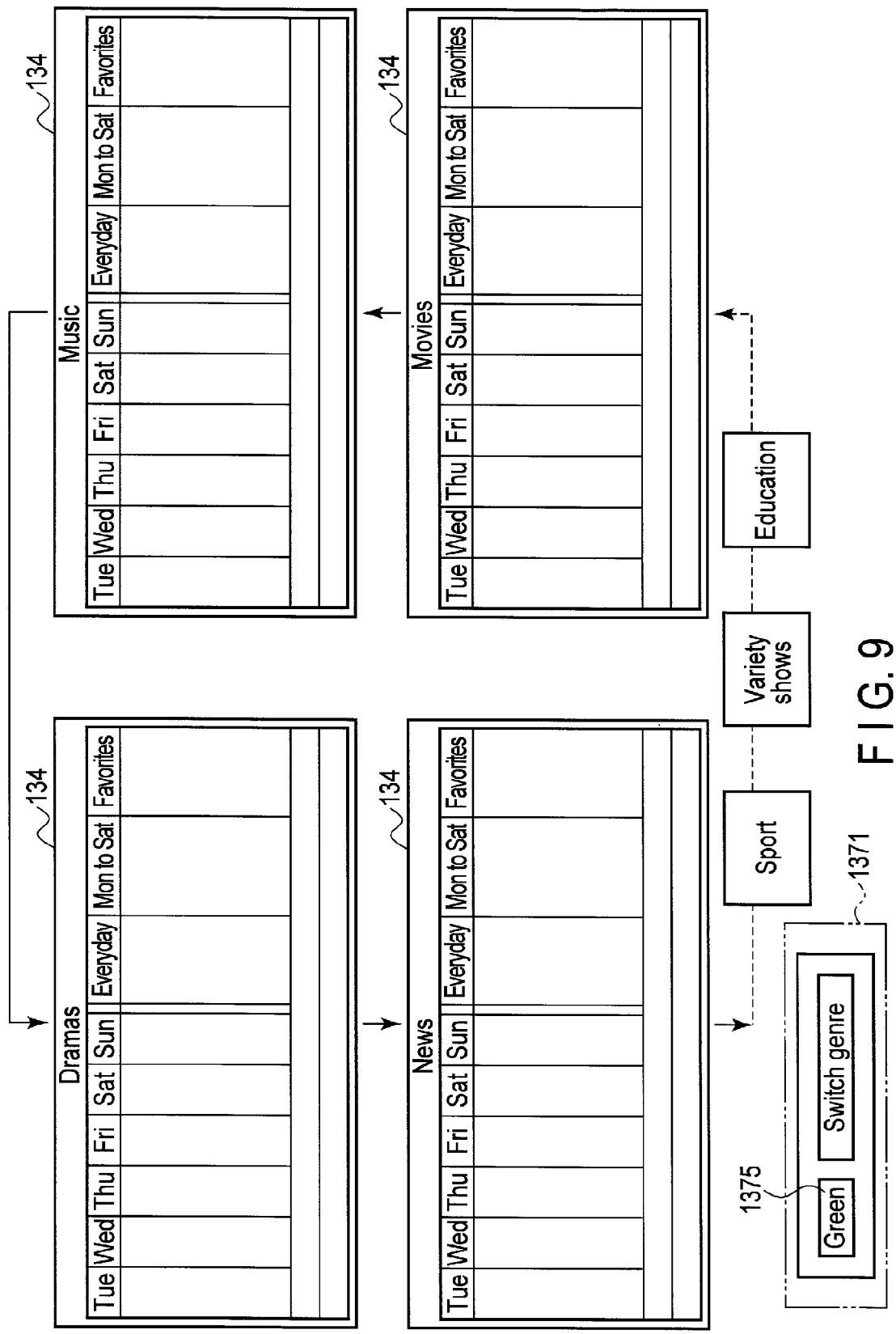
FIG. 9 shows how a program list is changed when a genre switching operation is executed by operating button 1374 shown in FIG. 6.

FIG. 9 shows that a program list is changed when button 1374 shown in FIG. 6 is operated to execute genre switching. The example of FIG. 9 shows how the program list is cyclically switched from genre to genre in the order of dramas, sport, variety shows, education, movies and music.

Figure 10:
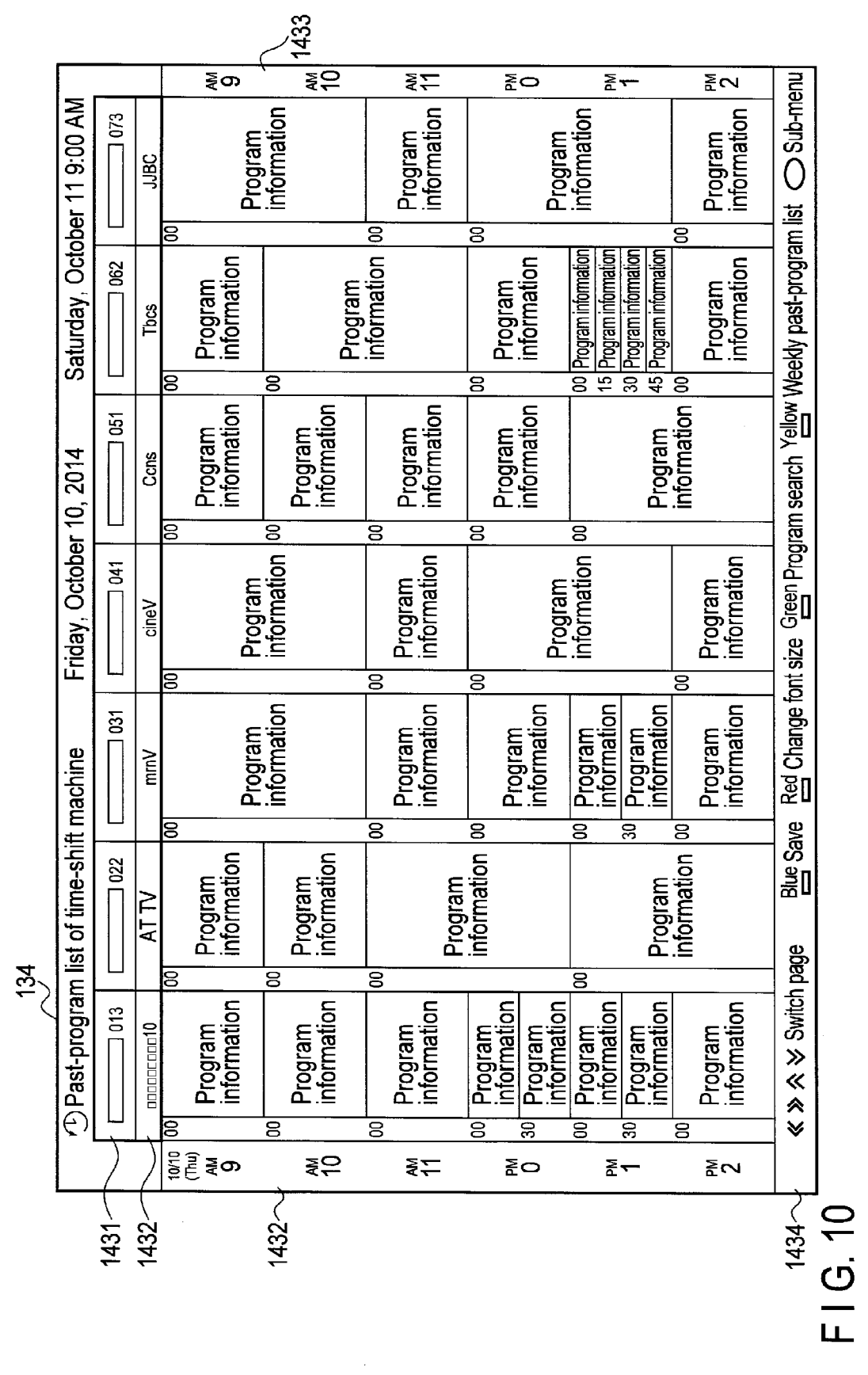

FIG. 10 shows a display example of a normal past-program list which is displayed when operation button 1375 of FIG. 6 is operated. In the image of the normal past-program list, the genre is not specified. In the upper part of the screen, for example, the item "past-program list of time-shift machine", the time and date of programs and the current date are displayed. In display area 1431, a plurality of channel numbers are described from left to right. In display area 1432 under display area 1431, for example, broadcast station names corresponding to the channel numbers are displayed.

In the leftmost column (area 1432) and the rightmost column (area 1433) of the screen of the display device 134, times are described for indicating broadcast hours. In the column extending under each channel description, program information is described based on time periods. This program list also displays operation guides in a lower area 1434. Specifically, buttons of the remote controller 400 are displayed with messages indicating how the electronic apparatus behaves when the buttons are operated. When the normal past-program list is displayed, and the user searches for a program having a broadcast time or date different from the time or date displayed on the screen, it is necessary to display program information of the time and date of the program by performing a page-switching operation or a scroll operation.

Figure 11:
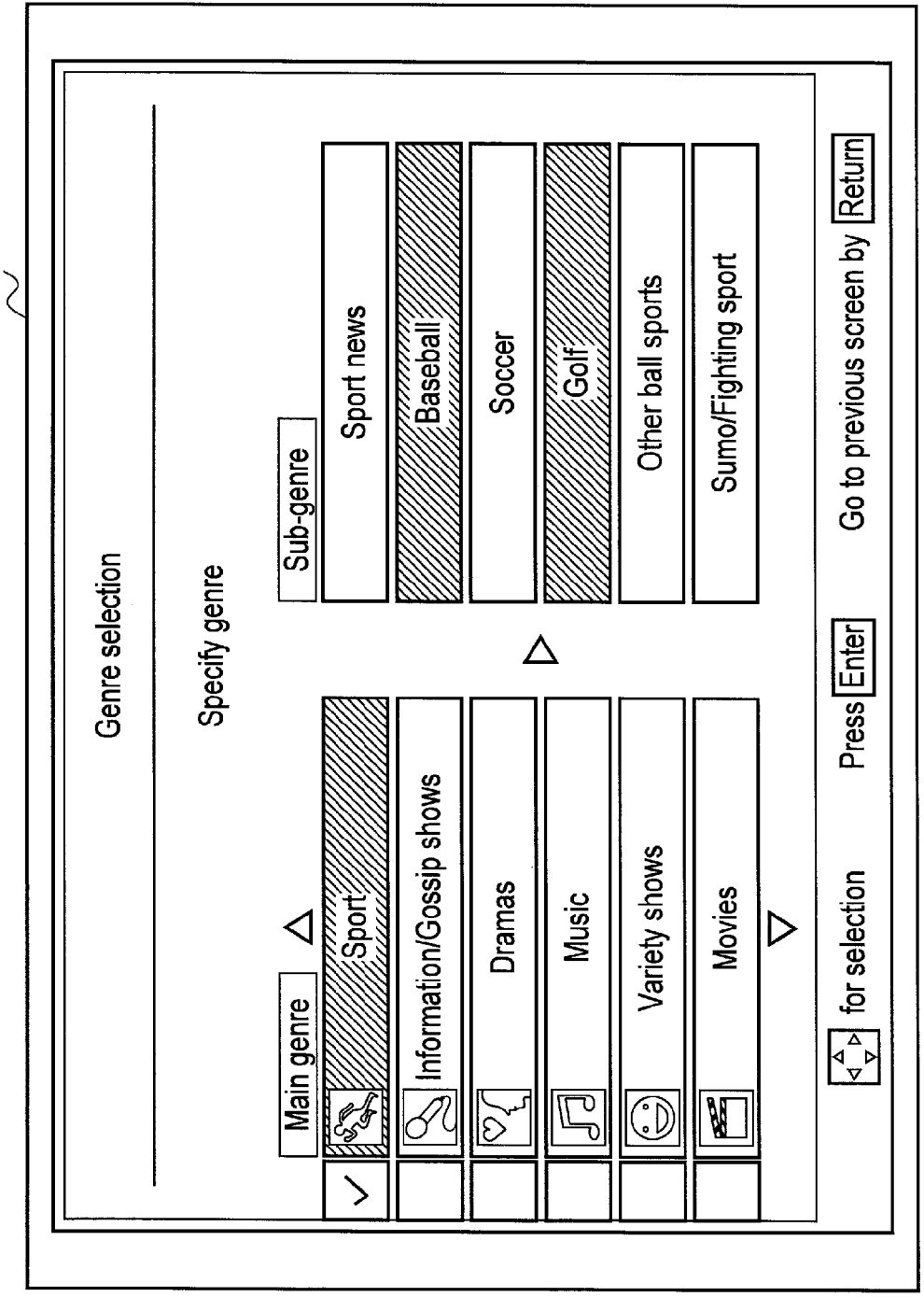
FIG. 11 shows an example of a menu for allowing the user to determine the genre of programs in classification at the time of default setting of a television apparatus 100.

FIG. 11 shows an example of a menu for allowing the user to determine the genre of programs in classification at the time of default setting of the television apparatus 100. For example, when the user selects the item "program list" in the main menu for default setting and subsequently selects the item "classification", the menu of FIG. 11 is displayed. The menu includes the items "sport", "information", "dramas", etc. In the example of FIG. 11, the user selects and checks the item "sport". The items of sub-genres are displayed with respect to the main genre. The user can specify sub-genres for classification. The user specifies a sub-genre for classification by selecting a desired item (sport news, baseball, soccer, etc.,) and, for example, pressing the enter button of the remote controller 400. In this manner, classification items are set.

FIG. 12 is an example of a menu for allowing the user to set the display form of a program list after setting classification items of genres. In this menu, as explained in FIG. 6, the user can set how program information description cells should be displayed. For example, as explained in FIG. 6, the user checks the items of Monday to Sunday if the user wants the program information description cells of the items to be displayed. Further, the user checks the items "everyday", "Mon to Sat" and "favorites". Lastly, the user presses the enter button of the remote controller 400. By this operation, the items shown in FIG. 6 are displayed.

FIG. 13 shows another embodiment in which the mobile device 700 is used as a display device. In the above explanation, a program list is displayed on the screen of the display device 134 of the television apparatus 100. However, the television apparatus 100 is configured to mutually communicate with the mobile device 700 as explained in FIG. 1. A program list may be displayed on the screen of the mobile device 700. The user may select the desired program on the mobile device 700. The result of the selection (program information) may be transmitted to the television apparatus 100.

Figure 14:
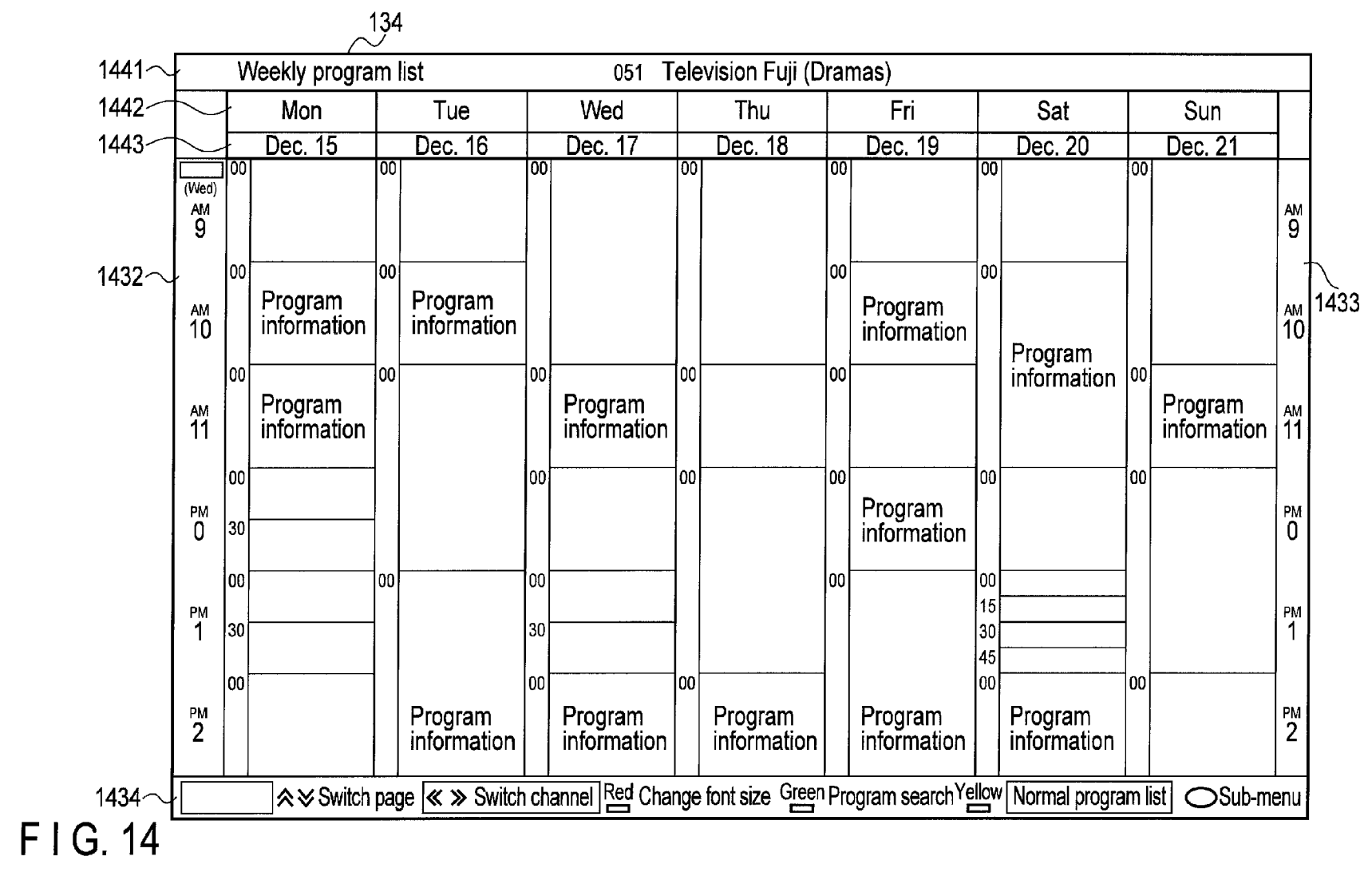

FIG. 14 shows another example of the display form of a program list. FIG. 14 shows a display example in which the layout of the program list is changed (or switched) based on control of the layout unit 2356 of the display form controller 2312.

To obtain the display mode of this program list, for example, the user selects the item "sub-menu" on the screen shown in FIG. 10 by the cursor and presses the enter button. To obtain the display of the program list of FIG. 14, of course, a different method may be used.

In this embodiment, the description "weekly program list" indicating the type of the program list is displayed in display area 1441 of the screen of the display device 134. In addition, the channel and the television-station name providing the programs, and the genre are displayed. For example, the genre of the program list of FIG. 14 is dramas. In display area 1442 of the screen of the display device 134, the days "Mon", "Tue", "Wed", "Thu", "Fri", "Sat" and "Sun" are displayed. In display area 1443, the date of each day is displayed.

In the leftmost column (area 1432) and the rightmost column (area 1433) of the screen of the display device 134, times are described for indicating broadcast hours of programs. In the column extending under each channel, program information is described based on time periods. This program list also displays operation guides in the lower area 1434. In the program list of FIG. 14, the number of blank program information description cells is large.

Figure 15:
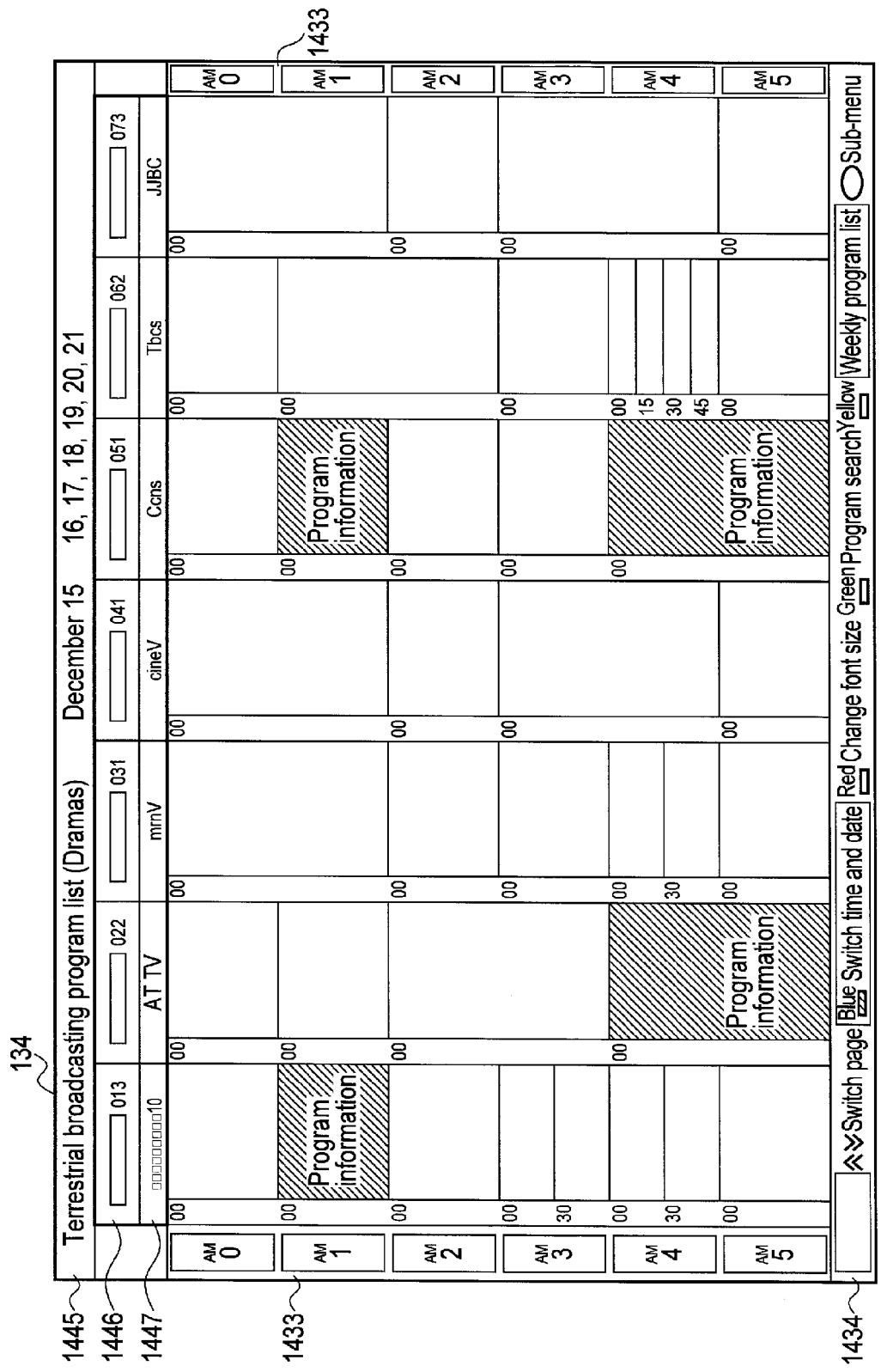
FIG. 15 shows another example of the display form of a program list.

FIG. 15 shows another example of the display form of a program list. FIG. 15 shows a display example in which the layout of the program list is changed (or switched) based on control of the layout unit 2356 of the display form controller 2312.

To obtain the display mode of this program list, for example, the user selects the item "sub-menu" on the screen shown in FIG. 10 or FIG. 14 by the cursor and presses the enter button. To obtain the display of the program list of FIG. 15, of course, a different method can be used.

In the program list of this embodiment, programs are sorted based on, for example, combinations of broadcast types and genres and are arranged in the order of times and dates.

In an upper display area 1445 of the screen of the display device 134, for example, the description "terrestrial broadcasting program list" indicating the broadcast type and the description "dramas" are displayed. In display area 1445, the date of the program list displayed on the screen is described. In the example of FIG. 15, the date "15 December" is displayed. FIG. 15 shows that the program list of 15 December is displayed. In display area 1446, a plurality of channel numbers are described from left to right. In display area 1447 under display area 1446, for example, the broadcast station names corresponding to the channel numbers are displayed. In the leftmost column (area 1432) and the rightmost column (area 1433) of the screen of the display device 134, times are described for indicating broadcast hours of programs. In the column extending under each channel, program information is described based on time periods. This program list also displays operation guides in the lower area 1434. In the program list of FIG. 15, the number of blank program information description cells is large.

FIG. 16 shows an example of an operation when resume reproduction is performed based on control of the reproduction form controller 232. As explained in FIG. 8, the electronic apparatus of the present embodiment comprises the overlap display processor 2362 and the expansion display processor 2363. The electronic apparatus may further have a resume reproduction function and a resume position display function.

When the user specifies overlap program information description cells 1385 by the cursor and presses the reproduction button of the remote controller 400, overlap program information description cells 1385 are expanded and displayed as a plurality of program information description cells a1 to a4 as shown in examples ex01 and ex02. When the program has been partially viewed, an indicator 1386 indicating the reproduction end can be displayed on the expanded program information description cells a1 to a4. In this case, the message "Resume reproduction?", time passage information and operation guides may be displayed as a pop-up image. In example ex01 of FIG. 16, time information indicating that the program has been viewed for forty five hours is displayed with the marks of the operation buttons indicating that the user agrees with and does not agree with resume reproduction. In example ex02 of FIG. 16, time information indicating that the first and second episodes have been viewed is displayed with the marks of the operation buttons indicating that the user agrees with and does not agree with resume reproduction.

In the example of FIG. 16, the marks are shown by a white square button and a white circular button. However, the marks are not limited to this example and may be shown by alphabets or numbers.

As stated above, the apparatus of the present embodiment comprises the overlap display processor 2362 which, when a plurality of program information description cells describing program information related to the same series programs are present, displays the program information description cells by overlapping them, the expansion display processor 2363 which displays the program information description cells by expanding the overlapped state, and the switching unit 2361 which switches the display state between the overlapped state and the expanded state. The apparatus is configured to perform display related to resume reproduction. The start position of resume reproduction may be displayed by hours within one program (example ex01). The start position of resume reproduction may be displayed by programs expanded and displayed (example ex02). The start position may be displayed by programs and hours at the same time. This display is convenient when, for example, the user views a feature-length drama over different days.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, even when a structural element is divided in a claim, or some elements are combined in a claim, or divided and combined elements are mixed in a claim, all of the claims are within the scope of the embodiments. Even when a claim is directed to control logic, a program including an instruction for execution on a computer, or a computer-readable recording medium in which the instruction is described, the apparatus of the embodiments is applied to the claim.

For example, the basic concept of a program stored on a computer-readable data storage medium processing past-program information may be described as follows. The program comprises an instruction for classifying a plurality of programs based on genres with reference to program information, and an instruction for classifying the classified programs based on broadcast days. The program further comprises an instruction for sorting program information description cells of the programs classified based on days into display areas based on days on a display device in order to control data for displaying a program list of a specified genre, and an instruction for displaying, when a program information description cell of a display area of a specified day is scrolled, program information description cells of display areas of days other than the specified day in a still state.

The program comprises an instruction for editing the number of characters described in one program information cell so as to fit within the predetermined number of lines. When the program is stored on a data storage medium (a magnetic disk, an optical disk, a semiconductor memory, etc.), the data storage medium falls within the scope of the embodiments. Transmission and reception of the program is also within the scope of the embodiments.

The program information and the program information description cells may be prepared in a memory unit in various languages. Of course, the user can switch the language of the program information and the program information description cells to a desired language in a display state. At this time, the language of sound output as audio may be the same as the display language. Thus, the apparatus may be a multi-lingual apparatus.

What is claimed is:
1. An electronic apparatus comprising:
   a genre classification unit which classifies a plurality of programs based on genres with reference to program information;
   a day classification unit which classifies the classified programs into the days of the week based on broadcast days; and
   a display form controller which
      controls data for displaying a program list of a specified genre,
      sorts program information description cells of the programs classified into the days of the week, into display areas on a display device, wherein the program information description cells for each of the days of the week are arranged on each of a plurality of columns on the display areas, and
      controls, when program information description cells of one of the plurality of columns are scrolled, data of program information description cells of a remaining one or more columns of the plurality of columns to be in a still state, the data in the still state maintained to be in a viewable state.

2. The electronic apparatus of claim 1, wherein the display form controller further comprises:
   an overlap display processor which displays, when a plurality of program information description cells describing program information related to same series programs are present, the program information description cells in an overlapped state;
   an expansion display processor which displays the program information description cells by expanding the overlapped state; and
   a switching unit which switches a display state between the overlapped state and an expanded state.

3. The electronic apparatus of claim 1, wherein the display form controller edits a number of characters described in each of the program information description cells so as to fit within a predetermined number of lines.

4. The electronic apparatus of claim 1, wherein the display form controller controls, when a plurality of program information description cells are present in a display area of a day, data in such a way that the program information description cells are displayed without spaces between the program information description cells.

5. The electronic apparatus of claim 1, wherein the display form controller sets a display area for a button of a remote controller and a message describing an operation state (behavior) to be obtained by operating the button, and the display area is set in a display area different from display areas of the program information description cells.

6. The electronic apparatus of claim 1, wherein the display form controller controls, when one of the program information description cells is specified by a cursor, data in such a way that detailed program information of a program corresponding to the specified program information description cell is displayed in a display area different from display areas of the program information description cells.

7. The electronic apparatus of claim 1, wherein the display form controller has a display mode for displaying the program list based on a single specified genre.

8. The electronic apparatus of claim 1, wherein the display form controller has a display mode for displaying the program list including a first genre and a second genre.

9. The electronic apparatus of claim 1, wherein the display form controller controls, when the program list showing days and time periods is displayed, and a plurality of program information description cells are present in a display area of a day, data in such a way that the program information description cells are displayed in accordance with broadcast hours of programs corresponding to the program information description cells.

10. A display method by an electronic apparatus comprising a program information processor which processes program information, the method comprising:
 classifying a plurality of programs based on genres with reference to the program information;
 classifying the classified programs into the days of the week based on broadcast days;
 sorting program information description cells of the programs classified into the days of the week, into display areas on a display device wherein the program information description cells for each of the days are arranged on each of a plurality of columns on the display areas; and
 controlling, when program information description cells of one of the plurality of columns are scrolled, data of program information description cells of a remaining one or more columns of the plurality of columns to be in a still state, the data in the still state maintained to be in a viewable state.

11. The display method of claim 10, further comprising:
 displaying, when a plurality of program information description cells describing program information related to same series programs are present, the program information description cells in an overlapped state;
 displaying the program information description cells by expanding the overlapped state; and
 switching a display state between the overlapped state and an expanded state.

12. The display method of claim 10 further comprising:
 editing a number of characters described in each of the program information description cells so as to fit within a predetermined number of lines.

13. The display method of claim 10 further comprising:
 controlling, when a plurality of program information description cells are present in a display area of a day, data in such a way that the program information description cells are displayed without spaces between the program information description cells.

14. The display method of claim 10 further comprising:
 setting a display area for a button of a remote controller and a message describing an operation state (behavior) to be obtained by operating the button, the display area being different from display areas of the program information description cells.

15. The display method of claim 10 further comprising:
 displaying, when one of the program information description cells is specified by a cursor, detailed program information of a program corresponding to the specified program information description cell in a display area different from display areas of the program information description cells.

16. The display method of claim 10 further comprising:
 displaying the program list based on a single specified genre.

17. The display method of claim 10 further comprising:
 displaying the program list including a first genre and a second genre.

18. The display method of claim 10 further comprising:
 displaying the program list which shows days and time periods, and displaying, when a plurality of program information description cells are present in a display area of a day, the program information cells in accordance with broadcast hours of programs corresponding to the program information description cells.

* * * * *